Jan. 21, 1941.　　O. A. HANSEN ET AL　　2,229,081
DOUBLE-WALLED VACUUM INSULATED TANK CAR
Filed Aug. 19, 1939　　4 Sheets-Sheet 1
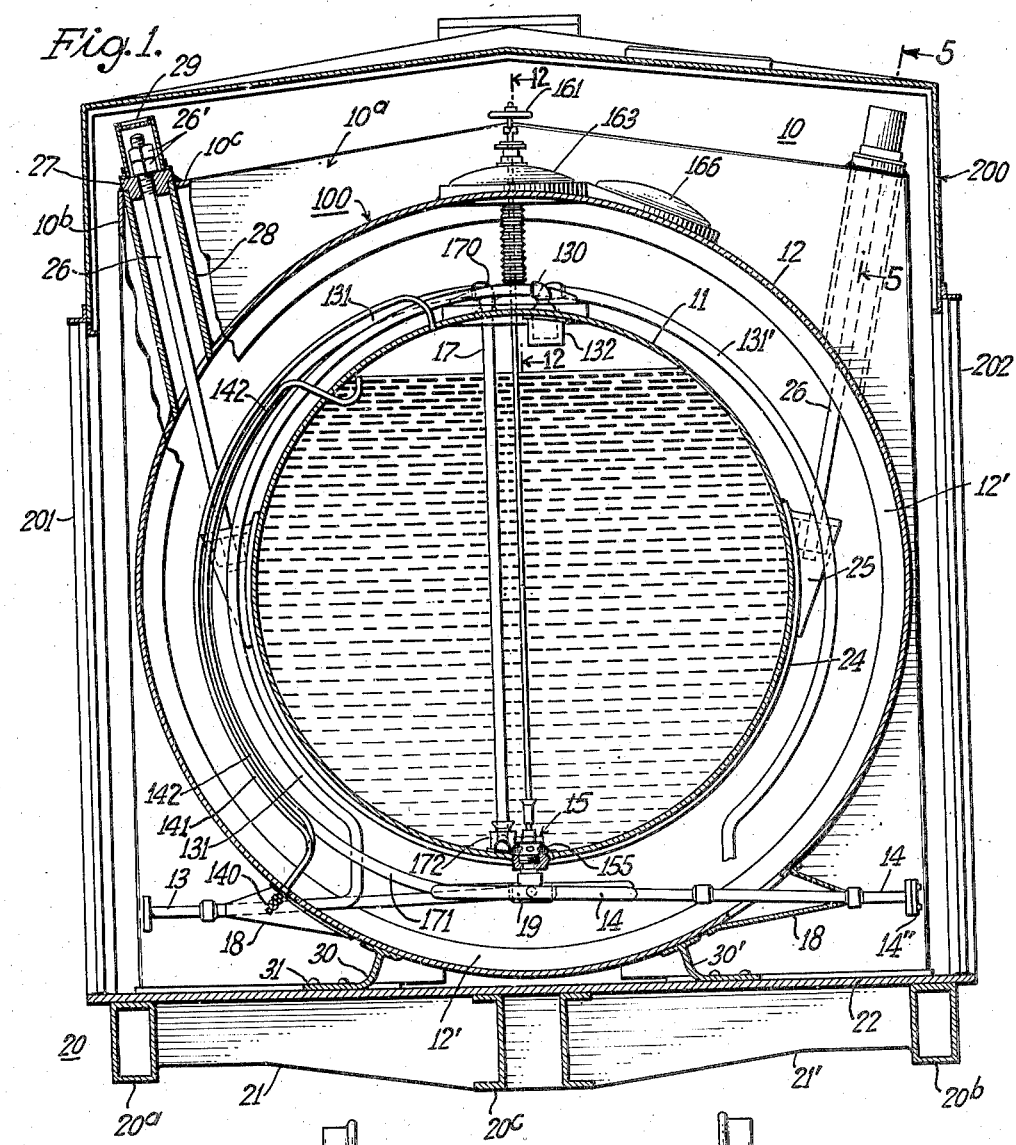
Fig.1.
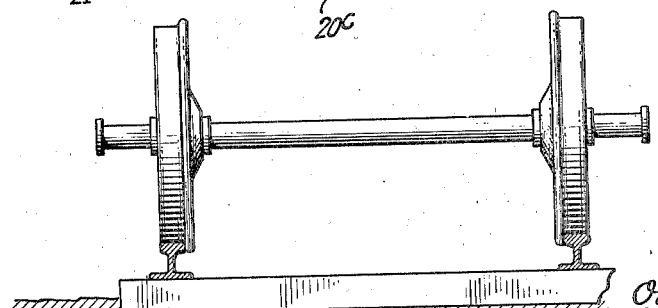
INVENTORS
Odd A. Hansen
BY James B. Van Vleet
Watson, Bristol, Johnson & Leavenworth
ATTORNEYS Jan. 21, 1941.  O. A. HANSEN ET AL  2,229,081
DOUBLE-WALLED VACUUM INSULATED TANK CAR
Filed Aug. 19, 1939  4 Sheets-Sheet 2

INVENTORS
Odd A. Hansen
James D. Van Vleet
BY
Watson, Bristol, Johnson & Leavenworth
ATTORNEYS

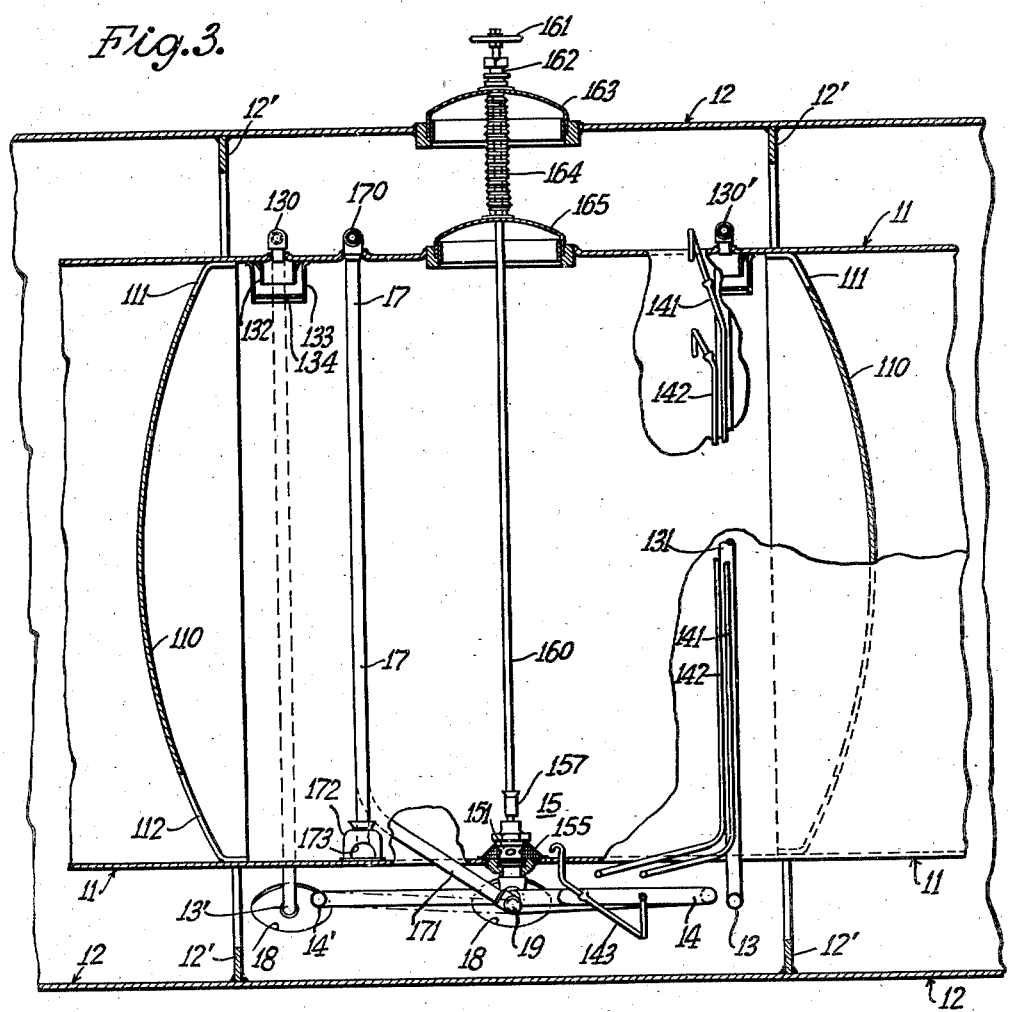
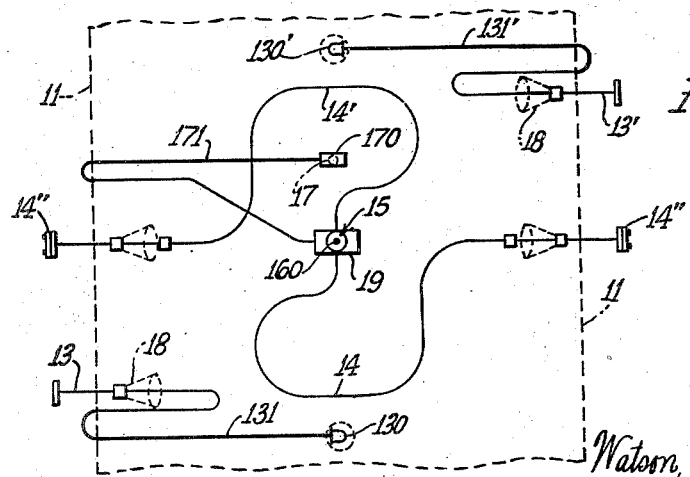

Jan. 21, 1941. O. A. HANSEN ET AL 2,229,081
DOUBLE-WALLED VACUUM INSULATED TANK CAR
Filed Aug. 19, 1939 4 Sheets-Sheet 4
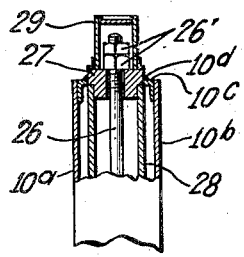
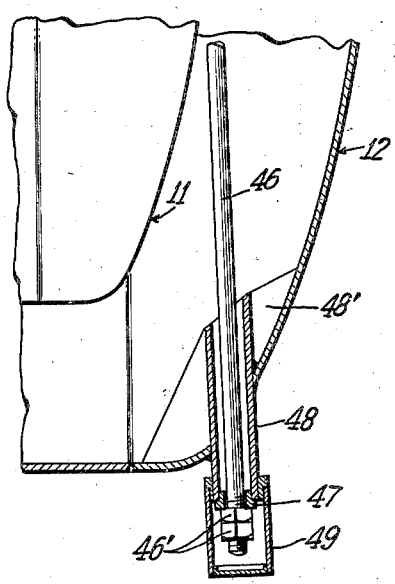
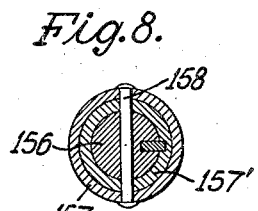
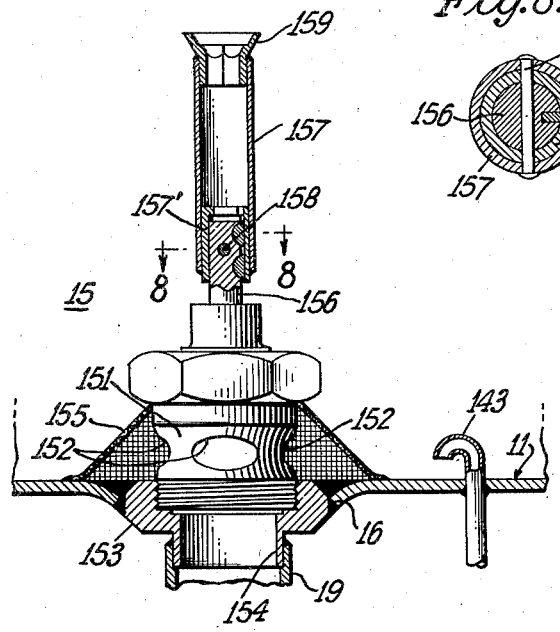
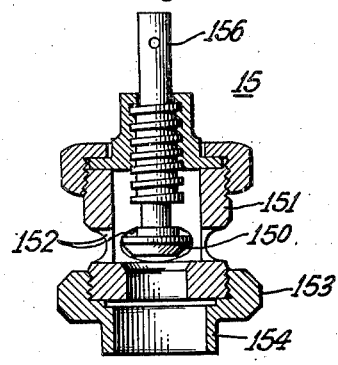
INVENTORS
Odd A. Hansen
BY James G. Van Vleet
Watson, Bristol, Johnson & Leavenworth
ATTORNEYS Patented Jan. 21, 1941

2,229,081

UNITED STATES PATENT OFFICE 2,229,081

DOUBLE-WALLED VACUUM INSULATED TANK CAR

Odd A. Hansen and James G. Van Vleet, Kenmore, N. Y., assignors to The Linde Air Products Company, New York, N. Y., a corporation of Ohio Application August 19, 1939, Serial No. 290,972

18 Claims. (Cl. 62—1)

This invention relates to double-walled tank cars and the like which may have their insulating space evacuated, and particularly to filling and withdrawal connections for such tank cars when designed for the handling and/or transportation of a liquefied gas, such as liquid oxygen.

The invention has for its object generally the provision of an arrangement of filling and withdrawal connections which affords both safety and convenience when filling or withdrawing liquid together with protection of the connections against injury whereby loss of liquid in transit may be avoided.

More specifically, the invention has for its object the provision of suitable filling and withdrawal connections in tank cars of the character indicated, such connections being arranged to be operated from either side of the car with substantially a maximum amount of certainty, convenience, and safety, and without liability to the impairment of the vacuum between the walls of the component vessels in the tank car.

Another object of the invention is to provide a tank car of the character indicated with filling and withdrawal connections having substantially no exposed parts including protected portions adapted to permit expansion and contraction in the conduit connections between the inner and outer vessels.

Another object is to provide a safe and convenient arrangement for insuring the withdrawal of liquid where an internal or protected valve is employed by the provision of suitable auxiliary withdrawal connections for use in effecting the withdrawal of liquid in the event of some failure in the valve mechanism.

Still another object is to provide convenient protecting and strengthening means for the whole tank car and its operating connections, including gas phase, liquid phase, and liquid-level indicating connections by the construction of a structure cooperating with the frame and arranged to enclose the tanks or vessels, such, for example, as a box-car housing.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is a view of a construction for double-walled tank cars provided with a protecting box-car housing, shown partly in elevation and partly in vertical section (the section being at right angles to the longitudinal axis of the car), the tank car being adapted for storing and/or transporting liquid oxygen in accordance with the invention;

Fig. 3 is an enlarged fragmentary sectional view taken in a vertical plane passing through the longitudinal axis of the tank car, the fragment shown being in the neighborhood of the gas phase and liquid phase connections of the tank car shown in Fig. 1;

Fig. 4 is a diagrammatic view on a reduced scale, showing a plan of the gas phase and liquid phase connections shown in Fig. 3;

Fig. 5 is a fragmentary sectional view taken on the line 5—5 in Fig. 1, showing details of the anchoring means here employed;

Fig. 6 is a fragmentary sectional view showing details of the staying means provided for bracing the inner vessel against side swaying;

Fig. 7 is another fragmentary sectional view showing details of a controlling means for the main liquid phase connection shown in Fig. 1;

Fig. 8 is a sectional view taken on the broken line 8—8 of Fig. 7;

Fig. 9 is still another fragmentary sectional view, showing interior details of the valve shown in Fig. 7.

Figure 2:
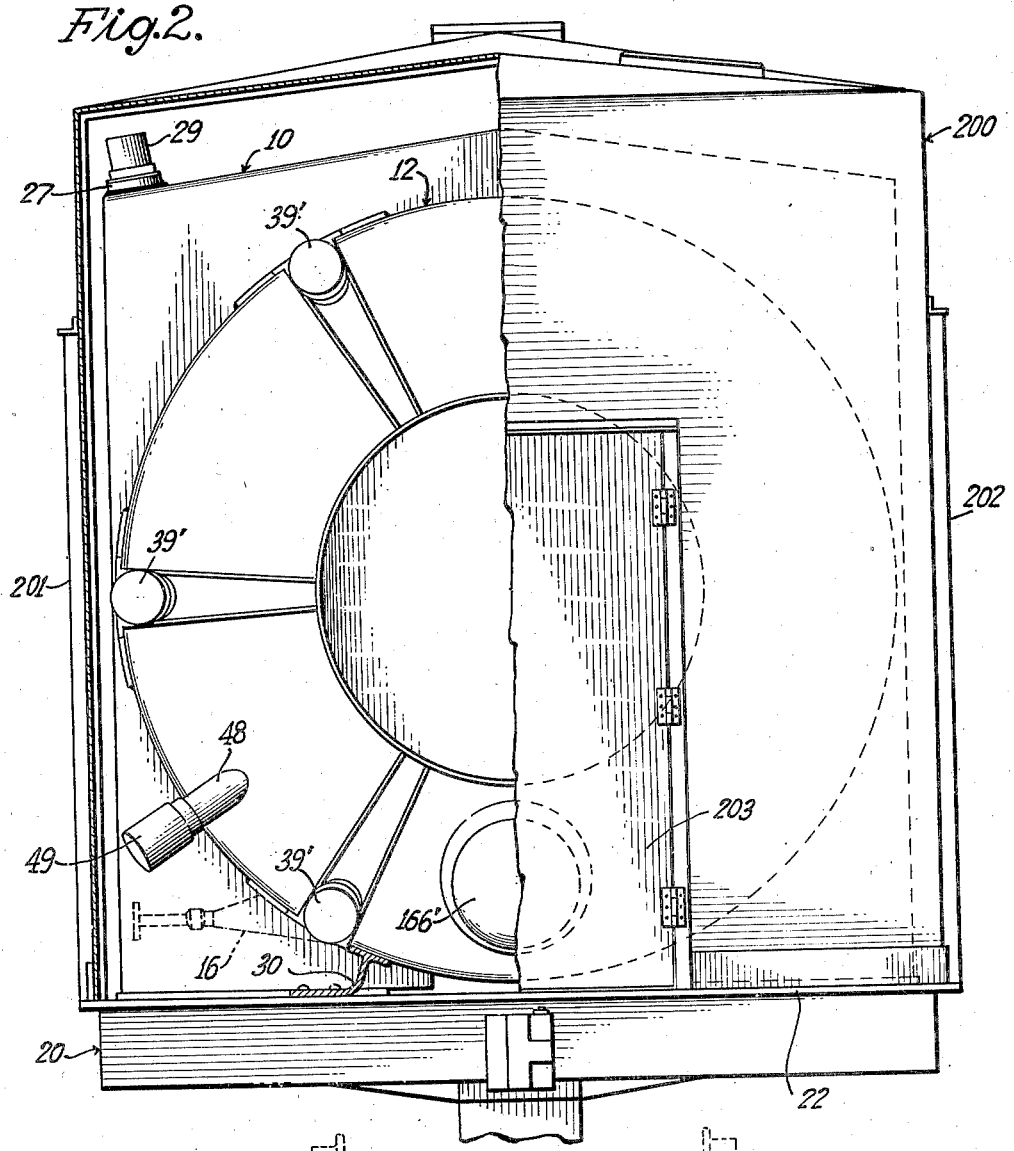
Fig. 2 is an enlarged end elevation of the tank car shown in Fig. 1, part of the box-car housing being broken away to show the end construction employed on the outer vessel of the tank car.
Figure 10:
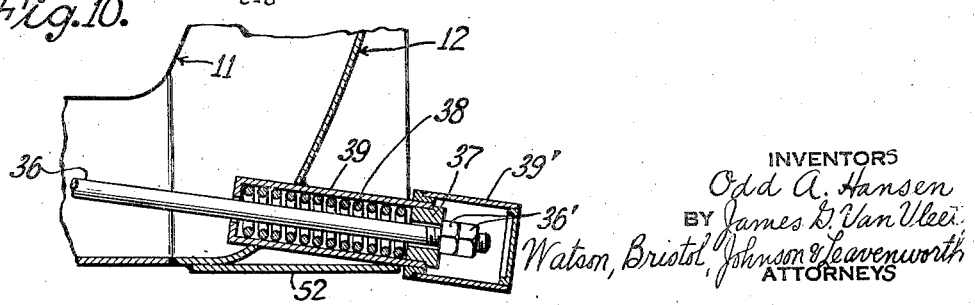
Fig. 10 is a fragmentary sectional view showing details of the staying means for anchoring an end of the inner vessel to an end wall of the outer vessel.

Referring now to the drawings, and particularly to Figs. 1 and 2, 10 denotes a supporting frame exteriorly associated with a cylindrical container, denoted generally 100. Two or more of such frames are employed, each of which supports individually the walls of the component vessels of the container 100. An inner vessel is shown at 11, supported from frame 10, such vessel being adapted to hold the liquefied gas that is to be placed or stored in the tank car, either with or without the aid of a lining or basket (not shown). Outside of the vessel 11 and spaced therefrom is a second or outer vessel 12 which is also supported from the frames 10, the manner of support being hereinafter more fully explained. The space between the vessels thus provided is a closed space and has no communication with the outside except that provided through certain evacuating connections which may be installed. The wall of the outer vessel is also preferably strengthened by one or more interiorly disposed stiffening rings, as shown at 12'.

The vessel 11 is here provided interiorly with baffle means for reducing or preventing splashing. To this end, there is shown in Fig. 3 a plurality of dished baffle plates 110. These are disposed throughout the interior of the vessel 11 at proper intervals and have one or more openings 111 at the top to permit passage of gas, while similar openings, although preferably larger, are provided at the bottom, as shown at 112, for permitting the free passage of liquid therethrough.

A gas phase connection 13 is provided, as shown in Figs. 1 and 3, leading through a bend 131 from a point within the inner vessel, preferably near the top, to a point adjacent one side of a car frame 20 outside the outer vessel, there being a similar gas phase connection 13' leading to a similarly located point on the other side of the car frame. A liquid phase connection 14 is also provided, leading from a point near the bottom of the vessel 11 to a suitable point outside the vessel 12 and disposed adjacent one side of the car frame, there being a similar liquid phase connection 14' at the other side. The liquid phase connections 14 and 14' have communication with the interior of vessel 11 through a common liquid controlling means 15 that is provided in an opening 16 (see Fig. 7) in the bottom wall of vessel 11. Removable closure plates may be provided on the end of these connections, if desired, as shown at 14'', on the exterior ends of connections 14 and 14'. When such closure plate is removed from a connection, the latter may then be connected to a suitable filling or receiving device, as the case may be. Each of the connections 13, 13', 14 and 14' is provided at the point where it passes through the wall of the vessel 12 with a suitable sealing means which has relatively low thermal conductivity, for example, with a conical sealing wall 18, as shown in section on connection 14, the conical wall being welded or otherwise rigidly secured in place between the wall of the outer vessel 12 and its connection. The vessel 11 may also be provided with one or more trycock connections, for example, as shown at 141, 142, and 143, each having a trycock 140, such connection being anchored at its outer end in a sleeve 144 in the wall of vessel 12.

The inner vessel 11 is here shown as provided also with an auxiliary liquid phase connection 17 leading from a point near the bottom of the vessel 12 and communicating through an elbow 170 near the top on the exterior of the vessel 11 with a branch 171 which extends about a side of the vessel 11 and communicates with a horizontal passage in a multi-way header 19 that is attached externally to the controlling means 16 and has an upwardly extending passage leading thereto. The header 19 is preferably formed with a pair of passages leading respectively in opposite directions to the connections 14 and 14', all as clearly shown in Fig. 4. The auxiliary connection here provided has no valve but is not without control. The controlling agent is seen to be the column of liquid which normally stands under the control of gravity in the portion of the conduit 17 that is within the inner vessel, such column being displaceable when desired by the application of pressure or suction.

In tank cars of the character here provided, the inner and outer vessels are, of course, relatively long cylindrical vessels and each frame 10, which supports the same, advantageously comprises a structure disposed on the car frame transversely of its longitudinal axis and employs one or more plate members as shown at 10a having strengthening webs, as indicated at 10b and 10c in Fig. 1, such plates each having a central opening of sufficient diameter to permit the snug passage of the vessel 12 through the same and its rigid attachment thereto, as by welding or the like. One such frame is disposed adjacent each end of the car frame, the latter being here shown as consisting of a center sill 20c and two side sills 20a and 20b.

In order that the frames 10 may be positioned at desired points along the car frame, the latter is provided with bolsters in addition to the conventional bolsters over the car trucks. Such additional bolsters are here shown as comprising transverse members 21 and 21' incorporated in the car frame. Over these additional bolsters the frames 10 are disposed; a strengthening plate 22 being preferably interposed between the additional bolsters and the frames 10. A series of such strengthening plates may be employed, if desired, and made to overlie and be secured to the car frame, forming, as it were, a floor. In such case, the car frame is additionally strengthened by the addition of a housing, such as the box-car housing 200. The box-car housing shown has side doors as indicated at 201 and 202 disposed on opposite sides of the car in the neighborhood of the terminal portions of the filling and withdrawal connections. The box-car housing is also advantageously provided with an end door 203, as shown in Fig. 2, in order to provide access to the clearance space in the end of the box-car housing.

The inner vessel 11 is supported directly from the frames 10 and not from the surface of the wall of vessel 12. This is here accomplished by the provision of girth members or slings 24 disposed about and preferably made fast to the bottom wall of the vessel 11 in the region of a frame 10. The upper end of each girth member is provided with a bracket or lug 25 in which is secured a sustaining rod or cable 26 which extends generally upwardly and outwardly and is made fast at its upper end to the frame 10 in any suitable manner, for example, by means of a collar, as shown at 27 in Figs. 1 and 5, that is welded in place in a web portion 10c. Each rod so provided is threaded at its upper end and passed through the collar 27 and has one or more nuts 26' in threaded engagement therewith and bearing upon the collar 27. The details shown in Figs. 1 and 5 for the frames 10 are no part of the present invention, such details being shown merely by way of example, since the frames may have other forms as more broadly taught in the copending applications filed in the name of Hansen on August 19, 1939, and designated by Serial Nos. 290,969 and 290,970, respectively.

In order to pass the rods 26 through the wall of vessel 12 in a gas-tight manner, openings are provided in the wall in the region where the rods are provided and a sleeve 28 disposed about each rod 26 and attached in a gas-tight manner, as by welding or brazing, to an edge of the opening in vessel 12, the other end of the sleeve being engaged with and made fast to the lower end of the collar 27 which is preferably reduced for the reception of the sleeve, the joint being sealed by welding or brazing, as shown in Fig. 5. The joint between the collar and nuts is also made gastight, while at the same time preserving adjustability of the nuts by disposing a cap or housing 29 over the nuts 26′, the cap being preferably secured in place by soft solder.

In order that the outer vessel 12 may be braced against end thrusts and otherwise afford additional support for the vessel, web members 30 and 30′ are preferably interposed between the car frame and the outside wall of vessel 12 at one or more points, for example, adjacent an additional bolster 21, as shown in Fig. 1. The members 30 and 31 may be of any convenient form, and those shown being made from an I-beam by cutting off the bottom flange and then bending over the web portion so as to provide an angle-portion which is bolted in place to the plate 22 as indicated at 31, the upper flange being made fast to the wall of the outer vessel in any imperforate manner, for example, by welding or brazing.

The inner vessel is also braced against end thrusts by suitable means, for example, by means of a stay rod, as shown at 36 in Fig. 10, made fast at one end to the wall of the inner vessel by suitable means and resiliently anchored at the other end in an end wall of vessel 12. This latter is accomplished by arranging each rod 36 to pass through a collar 37 and threading the same to receive nuts 36′ bearing on the collar, the collar being preferably arranged to react against a spring member 38 disposed in a receptacle 39, the receptacle having its inner end partially closed so as to support the spring member 38 but admits the free passage of a rod 36. Such receptacle is welded or otherwise hermetically sealed in the end wall and is reinforced in its position by means of a stay member 52. The receptacle 39 is also hermetically sealed by means of a closing housing 39′ that is also preferably secured in place by means of soft solder.

The inner vessel is advantageously stayed against swaying in the outer vessel by means of two or more downwardly and outwardly disposed stay rods 46 made fast at one end to an end wall of inner vessel 11 and anchored at their lower ends in the end wall of the outer vessel 12, as shown in Fig. 6. This anchorage is accomplished by passing each rod 46 through a collar 47 and providing its end with threads for the reception of nuts 46′ that engage with the collar 47. Such collar is here shown as reduced at its inner end and slipped into a sleeve 48 which projects through a suitable opening in the end wall of vessel 12 and is both welded in place and reinforced in position by the insertion of staying webs, as shown at 48′. The outer end of each sleeve is also hermetically sealed by means of a housing 49 that is slipped over the outer end and may be secured by soft solder.

The arrangements of the gas phase connections 13 and 13′ are shown in Figs. 3 and 4, such connections leading from either side of the car. The liquid phase connections 14 and 14′ are also shown. When liquid is introduced into the inner vessel, either through connection 14 or 14′, gas is simultaneously displaced through the connections 13 and 13′, which communicate with the top space in vessel 11 through elbows, as shown at 130 and 130′. These elbows are preferably welded in openings formed in the top wall of the vessel 11 and have downwardly depending ends which may with advantage be provided with means for excluding liquid arising from splashing. This means is shown as comprising a depending annulus 132 secured on the inside of the top wall of vessel 11 concentric with the depending end of the elbow. Spaced from the annulus 132 is a second or outer annulus 133 which is also secured to the inside of vessel 11 concentric with the annulus 131. This outer annulus is preferably perforated at the top at one or more points, so as to permit free passage of gas into the annulus. At the lower end of the annulus 132 there is inserted a plate 134 which is preferably perforated to permit drainage into the interior of the vessel 11.

The arrangement employed for the auxiliary liquid phase connection 17 is shown in Fig. 3 in which a riser portion communicates with an elbow 170 at the top of the vessel 11, the elbow being preferably welded in place. From the elbow 170 there leads a portion or bend 171 that communicates with the header 19 so as to effect withdrawals of liquid on opposite sides of the car. The inner end of the riser portion of connection 17 reaches nearly to the bottom of vessel 11 and is slipped into a centering device 172, disposed interiorly on the bottom wall of vessel 11. The centering means 172 has one or more openings at the sides, as shown at 173.

A preferred construction for the liquid controlling means 15 is shown in Figs. 7, 8, and 9. Here, a valve member 150 in a cage 151 that has side openings 112 is provided and screwed downwardly into a receptacle member 153 which is welded in a substantially flush manner in an opening in the bottom wall of vessel 11. This receptacle member is provided with a depending nipple 154 leading into the header 19, the latter being secured thereto by brazing or welding. The valve cage 151 is also preferably surrounded with a filtering means, such as the perforated cone shown at 155. A valve actuating stem 156 is shown in threaded engagement with a top closure element of the valve cage 151, which stem is arranged to be connected to a coupling sleeve 157 that is pinned to the stem by a pin 158. This is clearly shown in Fig. 8, where a reducing bushing 157′ is shown intervening between sleeve and stem. Sleeve 157 is provided at the top with a socket member 159 welded or otherwise rigidly secured in place. This member 159 is shaped (i. e., made with a square, hexagonal, or other shaped opening) to receive the lower or actuating end of a valve rod 160 (see Fig. 3) that is passed from a convenient exterior point downwardly through the walls of the inner and outer vessels and is provided at its top with a manually manipulated actuating wheel 161. The passage of the valve rod through the walls of the vessels 11 and 12 is accomplished in a gas-tight manner which also admits of limited relative movement between the vessels without straining the parts. This is accomplished by passing the stem 160 from the hand-wheel 161 through a packing gland at 162 which is welded or otherwise secured in the top of a dome 163 which in turn is welded or otherwise secured in an opening in the top wall of vessel 12. Extending interiorly from the packing gland around the valve rod down through the space between the vessels is an expansible bellows 164 which is welded to the gland at one end and at the other is secured in an opening in the top of another dome 165 that is hermetically sealed in the top wall of the vessel 11.

In addition to the opening in the top wall of vessel 12 over which the dome 163 is sealed, one or more additional top openings may be provided for affording access to the space between the walls of vessels 11 and 12 and also for the purpose of introducing a suitable filling of a substantially dry insulating material in a powdered or comminuted condition. A dome of this character is shown at 166 in Fig. 1, which would be sealed in place substantially in the same manner as is dome 163.

Other openings for access to the space between the walls of the vessels at points adjacent the bottom of vessel 12 are also preferably provided, one such other opening being shown closed by a dome 166', shown in an end wall near the bottom in Fig. 2; dome 166' being preferably constructed in a suitable manner for holding soft solder in place for sealing purposes.

In the arrangement of the pipe connections shown in Fig. 4, it is seen that the liquid phase connections each contain a loop disposed between the header 19 and the point where the connection passes through its cone 18 in the wall of vessel 12. The two loops of connections 14 and 14' together comprise a somewhat S-shaped conduit that is disposed in the space between the vessels 11 and 12 and enveloped by the powdered insulating material with which the space is filled. Thus, it is seen that the liquid phase connections are protected and adapted to accommodate not only movements due to expansion and contraction in the conduits themselves but also accommodate the movement caused by the limited relative motion between the vessels 11 and 12 without unduly straining the parts. The arrangement of auxiliary liquid phase connection 17 is also seen to have an outside section accommodating expansion and contraction and entering into the header 19. The gas phase connections 13 and 13' are also seen to be bent back upon themselves and provide looped sections prior to their exit through the wall of the vessel 12. By such loops as are thus provided, it is seen that expansion and contraction and other movement of these parts are also accommodated without unduly straining the parts.

The tank car thus constructed advantageously has the space between the vessels 11 and 12 evacuated, the vacuum which is pulled being of the order of 0.1 mm. of mercury. Such a degree of vacuum may be pulled by connecting the space between the vessels 11 and 12 through a suitable connection and a mechanical vacuum pump, which may be either permanently installed on the tank car or temporarily connected at a service or supply station. When the space between the vessels 11 and 12 has been properly filled and evacuated, the heat conductivity of the space between the vessels is reduced to relatively low value and a liquefied gas stored or introduced into the inner vessel may be retained therein for long periods of time without substantial losses of gas material by reason of evaporation. The order of the vacuum and the nature of the filling for the insulating space is no part of the present invention, that here described being merely by way of example and in accordance with the teaching of the invention disclosed in copending application filed in the name of Dana on December 7, 1939, Serial No. 307,945.

In operation, when it is desired to fill the inner vessel of the present tank car with a liquefied gas, such as liquid oxygen, the car is backed up upon a suitable siding at a production plant, and a car door, for example, that at 201, opened so that a liquid phase connection, such as shown at 14, may be connected with the source of supply. Liquid is forced through such connection into the vessel 11 under pressure, any gas within the vessel 11 finding free exit through the gas phase connections 13 and 13' which are freely open to the atmosphere.

To ascertain when the vessel 11 is properly filled with liquid, the trycocks 140 may be opened from time to time, their connections being shown respectively at 141, 142, and 143. The trycock connection 141 is normally always in communication with a gas space within the vessel 11. Should liquid come out of this connection when open, it is an indication that the vessel is too full. When only connection 142 shows liquid while connection 141 vents gas, it is an indication that the desired liquid level within the vessel 11, shown in Fig. 1, is attained. Filling of the vessel 11 from the production plant is accordingly discontinued. The trycock connection at 143 (see Fig. 3) may be opened from time to time when the vessel 11 is discharging to ascertain when the vessel is fully discharged. As long as the trycock connection 143 gives a discharge of liquid, it is an indication that the vessel 11 contains enough liquid to continue the supply of liquid through the controlling means to the header 19.

During transit, the car doors 201 and 202 are closed and locked (car-seals being applied if desired), as well as any end doors that may be in the box-car housing. It is thus seen that all parts of the tank car construction here provided are protected. When such tank car has arrived at a consumer installation, the car is again backed up on a siding adjacent a receiving device and a car door opened, for example, that at 202, and the closure plate at the end of a liquid phase connection, such as is on 14, removed and a hose connection attached. When it is desired to withdraw liquid, the hand wheel 161 is manipulated so as to move the valve from its seat in the valve casing 151. Liquid under the influence of gravity in consequence passes into the header 19 and through the connection 14 into the receiving device, any contraction in the conduit being readily accommodated by the looped parts in the evacuated space between vessels 11 and 12. The gravity flow of liquid under these circumstances is seen to be readily accomplished, since air pressure from the outside atmosphere is always acting on the top of the liquid in the inner vessel through the gas phase connections 13 and 13'. In the event of any injury to the controlling means so as to prevent the valve from being properly opened by the valve rod 160 within the vessel 11, liquid may still be withdrawn from the vessel 11 through the auxiliary liquid phase connection 17. To start this connection operating while the valve at 15 is shut, pressure is, of course, required. This may be introduced from an external source through a gas phase connection, for example, through connection 13, when connection 13' is sealed by a closure plate on its end. Such pressure will lift liquid in the connection 17 past the elbow 170 and into branch 171 and from thence into header 19, the flow continuing so long as the pressure continues. The auxiliary connection is thus seen to be a safety means which insures the discharge of the vessel in the event of sticking of the valve at 15 or other injury thereto. The sliding engagement of the valve rod 160 with the valve stem, whereby it is manipulated from the handwheel 161, outside the vessel is seen to afford an operating connection with a relatively high degree of certainty of operation and relatively free from trouble.

A tank car thus constructed and protected is seen to be adapted to the holding of the vacuum in the insulated space without substantial change for relatively long periods of time, particularly in view of the fact that both the inner and outer vessels are braced against thrusts and side swaying, which might tend to the straining of the parts and induce leaks in the walls of the outer vessel, the bracing being applied in an imperforate manner.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a double-walled tank car construction, the combination with a supporting car structure having a frame, of an inner cylindrical vessel adapted for holding a liquefied gas, an outer vessel surrounding and spaced from said inner vessel thereby providing an intervening space for insulating purposes, means for supporting said vessels mounted on said car structure, a gas phase conduit leading from an external point to the gas space in the top of said inner vessel, a liquid phase conduit leading from an opening in the lower wall of said inner vessel and extending laterally through the wall of said outer vessel, a liquid controlling means in said inner vessel for controlling at will the passage of liquid to and from said opening, and sealing means of low thermal conductivity interposed between each of said conduits and the wall of said outer vessel.

2. In a double-walled tank car construction, the combination with a supporting car structure having a frame, of an inner cylindrical vessel adapted for holding a liquefied gas, an outer vessel surrounding and spaced from said inner vessel thereby providing an intervening space for insulating purposes, means for supporting said vessels mounted on said car structure, a gas phase conduit leading from an external point on one side of said car frame to the gas space in the top of said inner vessel, a liquid phase connection leading from an opening in the lower wall of said inner vessel to a point on the exterior of the outer vessel at another side of said car frame, sealing means having relatively low thermal conductivity interposed between each of said connections and the wall of said outer vessel, each of said connections including an expansion loop located in said intervening space, and liquid controlling means in said inner vessel for controlling at will the passage of liquid to and from said opening.

3. In a double-walled tank car construction having a frame, the combination with a supporting car structure, of an inner cylindrical vessel adapted for holding a liquefied gas, an outer vessel surrounding and spaced from said inner vessel thereby providing an intervening space for holding insulating material and adapted to be evacuated, supporting means for said vessels associated with said car structure, said means including connections for separately supporting each of said vessels, the lower wall of said inner vessel being provided with an opening, a liquid phase connection leading from said opening and extending laterally through the wall of said outer vessel, sealing means interposed between said connection and the wall of said outer vessel, a liquid controlling means having a valve disposed in said inner vessel for controlling the passage of liquid to and from said opening, a valve operating means extending into said inner vessel from a point without said outer vessel for actuating said valve, and an auxiliary liquid phase connection having a liquid seal adapted to be under a differential pressure control and leading from a point within said inner vessel near the bottom of the same and communicating with said first-named liquid phase connection.

4. In a double-walled tank car construction, the combination with an inner cylindrical vessel adapted for holding a liquefied gas, of an outer cylindrical vessel disposed about and spaced from said inner cylindrical vessel thereby providing an intervening space for holding insulating material and adapted to be evacuated, a car frame having a center sill provided with a bolster, a second frame for supporting said vessels disposed in supporting relation over said bolster, said second frame including means for individually supporting the walls of each of said vessels, a gas phase connection leading from a point without said outer vessel through said intervening space to an opening adjacent the top of said inner vessel, a liquid phase connection leading from a point adjacent the bottom of said inner vessel through said intervening space to a point without said outer vessel, and valved controlling means within said inner vessel for regulating the passage of liquid through said liquid phase connection.

5. In a double-walled tank car construction, the combination with a supporting car structure, of an inner cylindrical vessel adapted for holding a liquefied gas, an outer vessel surrounding and spaced from said inner vessel thereby providing an intervening space for holding insulating material and adapted to be evacuated, means for supporting said vessels mounted on said car structure, said means including connections for separately supporting said vessels, liquid phase conduits leading from a common header communicating with an opening in the lower wall of said inner vessel and provided with outer portions passing laterally in opposite directions through the wall of said outer vessel, sealing means interposed between each of said outer portions and the wall of said outer vessel, liquid controlling means having a valve and disposed in said inner vessel for regulating at will the passage of liquid to and from said header, a valve actuating means including a rod extending into said inner vessel from a point without said outer vessel and arranged to operate said valve, and means for hermetically sealing the passage of said rod disposed between said vessels.

6. In a double-walled tank car construction, the combination with a supporting car structure, of an inner cylindrical vessel adapted for holding a liquefied gas, an outer vessel surrounding and spaced from said inner vessel thereby providing an intervening space which is substantially closed, means for supporting said vessels mounted on said car structure, said means including connections for separately supporting said vessels, a multi-way header in said intervening space and communicating with an opening in the lower wall of said inner vessel, a liquid phase conduit connected to said header and extending laterally through the wall of said outer vessel, sealing means interposed between said conduit and the wall of said outer vessel and including an expansion loop located at a point between said header and the outer end, a liquid controlling means having a valve in said inner vessel for regulating the passage of liquid to and from said header, a valve actuating means including a rod extending into said inner vessel from a point without said outer vessel and connected to said valve, and an expansible bellows disposed between said vessels about said rod and provided with hermetic sealing means for securing the same in the walls of said vessels.

7. In a double-walled tank car construction, the combination with a supporting car structure, of an inner cylindrical vessel adapted for holding a liquefied gas, an outer vessel surrounding and spaced from said inner vessel thereby providing an intervening space which is substantially closed, means for supporting said vessels mounted on said car structure, said means including connections for separately supporting said vessels, liquid phase conduits leading from a common header communicating with said inner vessel through an opening in the lower wall of said inner vessel, said header having passages from which said conduits lead laterally in opposite directions through the wall of said outer vessel, sealing means having relatively low thermal conductivity interposed between each of said conduits and the wall of said outer vessel, each of said conduits including an expansion loop located at a point between said header and the outer ends and disposed in said intervening space, liquid controlling means having a valve disposed in said inner vessel for controlling at will the passage of liquid through said header, and a valve actuating rod extending into said inner vessel from a point without said outer vessel and provided with a sliding connection with said controlling means.

8. In a double-walled tank car construction, the combination with a supporting car structure, of an inner cylindrical vessel adapted for holding a liquefied gas, an outer vessel surrounding and spaced from said inner vessel thereby providing an intervening space which is substantially closed, means for supporting said vessels mounted on said car structure, said means including connections for separately supporting said vessels, a liquid phase conduit leading from a common header communicating with said inner vessel through an opening in the lower wall of said inner vessel, said header having at least one passage from which said conduit leads laterally in through the wall of said outer vessel, sealing means having relatively low thermal conductivity interposed between said conduit and the wall of said outer vessel, liquid controlling means having a valve disposed in said inner vessel for controlling at will the passage of liquid through said header, and means comprising a rod for actuating said valve extending into said inner vessel from a point without said outer vessel and having sliding connection to said controlling means.

9. In a double-walled tank car construction, the combination with an inner cylindrical vessel adapted for holding a liquefied gas, of an outer cylindrical vessel disposed about and spaced from said inner cylindrical vessel thereby providing an intervening space for holding insulating material and adapted to be evacuated, a car frame having a center sill provided with a bolster, a second frame for supporting said vessels disposed in supporting relation over said bolster, said second frame including means for individually supporting the walls of each of said vessels, a gas phase connection leading from a point without said outer vessel through said intervening space to an opening adjacent the top of said inner vessel, a liquid phase connection leading from a point adjacent the bottom of said inner vessel through said intervening space to a point without said outer vessel, valved means within said inner vessel for controlling the passage of liquid through said liquid phase connection, and means for hermetically sealing the passage of each of said connections through the wall of said outer vessel in a manner interposing a relatively large amount of thermal resistance to the passage of heat from said outer vessel to said connections.

10. In a double-walled tank car construction, the combination with an inner cylindrical vessel adapted for holding a liquefied gas, of an outer cylindrical vessel disposed about and spaced from said inner cylindrical vessel thereby providing an intervening space for holding insulating material and adapted to be evacuated, a car frame having a center sill provided with a bolster, a second frame for supporting said vessels disposed in supporting relation over said bolster, said second frame including means for individually supporting the walls of each of said vessels, a gas phase connection leading from a point without said outer vessel through said intervening space to an opening adjacent the top of said inner vessel, a liquid phase connection leading from a point adjacent the bottom of said inner vessel through said intervening space to a point without said outer vessel, a controlling means having a valve member disposed within said inner vessel at the entrance to said liquid phase connection, a valve rod extending from an external operating point through the walls of said vessels into operating engagement with said valve member, and means for hermetically sealing the space between said vessels from said valve rod.

11. In a double-walled tank car construction, the combination with an inner cylindrical vessel adapted for holding a liquefied gas, of an outer cylindrical vessel disposed about and spaced from said inner cylindrical vessel thereby providing an intervening space for holding insulating material and adapted to be evacuated, a car frame having a center sill provided with a bolster, a second frame for supporting said vessels disposed in supporting relation over said bolster, said second frame including means for individually supporting the walls of each of said vessels, a gas phase connection leading from a point without said outer vessel through said intervening space to an outlet adjacent the top of said inner vessel, a liquid phase connection leading from a point adjacent the bottom of said inner vessel through said intervening space to a point without said outer vessel, a controlling means having a valve member disposed within said inner vessel at the entrance to said liquid phase connection, a valve rod extending from an external operating point through the walls of said vessels into operating engagement with said valve member, a packing gland disposed in the wall of said outer vessel to accommodate the passage of said valve rod, passage means disposed on the outer wall of said inner vessel for similarly passing said valve rod into said inner vessel, and an expansible bellows member extending from said packing gland to said passage means and hermetically sealed to each.

12. In a double-walled tank car construction, the combination with a supporting car structure, of an inner cylindrical vessel adapted for holding a liquefied gas, an outer vessel surrounding and spaced from said inner vessel thereby providing an intervening space for holding insulating material and adapted to be evacuated, frames mounted in said car structure, each having connections for separately supporting said vessels, a pair of oppositely extending liquid phase conduits leading from a common outlet in the lower wall of said inner vessel, said conduits extending through the wall of said outer vessel, sealing means interposed between each of said conduits and the wall of said outer vessel, each of said conduits including an expansion loop located at a point between said common outlet and said sealing means, liquid controlling means having a valve disposed in said inner vessel for regulating the passage of liquid at said common outlet, a valve actuating rod extending into said inner vessel from a point without said outer vessel to engage with the valve in said controlling means, an auxiliary liquid phase conduit leading from a point within said inner vessel near the bottom of the same to a point outside the top wall thereof, and a communicating conduit disposed in said intervening space for connecting said auxiliary conduit with said liquid phase conduits at a point below said liquid controlling means whereby liquid withdrawal may be effected independently of the actuation of said liquid controlling means.

13. In a double-walled container, the combination comprising inner and outer vessels, the former of which is provided with an opening in its bottom wall, a liquid controlling device disposed within said inner vessel for regulating the passage of liquid through said opening, said device comprising a valve cage having an opening for communication with the interior of said vessel, a downwardly depending boss and a valve member seating interiorly of the cage at the mouth of said boss, a nipple adapted for detachable engagement with said boss and brazed into place in said opening, a connection connected to said nipple and passing to a desired point on the exterior of said outer vessel, and means on the exterior of said outer vessel extending into said inner vessel for actuating said valve member.

14. In a double-walled container, the combination comprising inner and outer vessels, the former of which is provided with an opening in its bottom wall, a liquid controlling device disposed within said inner vessel for regulating the passage of liquid through said opening, said device comprising a valve cage having an opening for communicating with the interior of said vessel, a downwardly depending boss and a valve member having an upwardly extending valve stem and adapted to seat interiorly of the cage at the mouth of said boss, a nipple in detachable engagement with said boss and brazed into place in said opening, a connection connected to said nipple and passing to a desired point on the exterior of said outer vessel, a sleeve on said valve stem for providing sliding engagement therewith, and a valve actuating rod extending from a desired point on the exterior of said outer vessel and passing through said inner vessel for sliding engagement with said valve stem sleeve.

15. In a double-walled container, the combination comprising inner and outer vessels, the former of which is provided with an opening in its bottom wall, a liquid controlling device disposed within said inner vessel for regulating the passage of liquid through said opening, said device comprising a valve cage having an opening for communicating with the interior of said vessel, a downwardly depending boss and a valve member having an upwardly extending actuating stem and adapted to seat interiorly of the cage at the mouth of said boss, a nipple in detachable engagement with said boss and brazed into place in said opening flush with the interior surface of the bottom wall of said inner vessel, a connection connected to said nipple and passing to a desired point on the exterior of said outer vessel, a screen for preventing the passage of undesired particles in the liquid disposed about said cage, a sleeve on said valve stem having a follower adapted for sliding engagement, a valve actuating rod extending from a desired point on the exterior of said outer vessel through said inner vessel into engagement with said follower, and means for hermetically sealing the passage of said valve actuating rod through the walls of said inner and outer vessels.

16. In a double-walled tank car construction, the combination with an inner cylindrical vessel adapted for holding a liquefied gas, of an outer cylindrical vessel disposed about and spaced from said inner vessel thereby providing an intervening space for holding insulating material and adapted to be evacuated, a car frame for transporting said vessels including a center sill, a second frame for mounting said vessels in supporting relation over said center sill, means cooperating with the second frame for strengthening the same and imparting conventional clearances, conduit connections affording ingress and egress of the gas material held in said inner vessel disposed in said insulating space and passing through the cylindrical wall of said outer vessel and terminated exteriorly thereof at a point within the conventional clearances of said car frame, and means for hermetically sealing the passage of said conduit connections through said cylindrical wall.

17. In a double-walled tank car construction, the combination with an inner cylindrical vessel adapted for holding a liquefied gas, of an outer cylindrical vessel disposed about and spaced from said inner vessel thereby providing an intervening space for holding insulating material and adapted to be evacuated, a car frame for transporting said vessels having conventional clearances and provided with a center sill, a second frame for mounting said vessels in supporting relation over said center sill, a superstructure on said car frame for protecting said vessels and disposed in a manner imparting additional strength and stiffness to said car frame, conduit connections affording ingress and egress of the gas material held in said inner vessel disposed in said insulating space and passing through the cylindrical wall of said outer vessel and terminated exteriorly thereof at a point within the conventional clearances of said car frame and within said superstructure, and means for hermetically sealing the passage of said conduit connections through said cylindrical wall.

18. In a double-walled tank car construction, the combination with an inner cylindrical vessel adapted for holding a liquefied gas, of an outer cylindrical vessel disposed about and spaced from said inner vessel thereby providing an intervening space for holding insulating material and adapted to be evacuated, a car frame for transporting said vessels having conventional clearances and provided with a center sill, a second frame for mounting said vessels in supporting relation over said center sill, a superstructure on said car frame for protecting said vessels and disposed in a manner imparting additional strength and stiffness to said car frame, conduit connections affording ingress and egress of the gas material held in said inner vessel disposed in said insulating space and passing through the cylindrical wall of said outer vessel and terminated exteriorly thereof at a point within the conventional clearances of said car frame and within said superstructure, means for hermetically sealing the passage of said conduit connections through said cylindrical wall, and movable members associated with said superstructure adapted to be moved into positions affording ready access to said external terminals of said connections.

ODD A. HANSEN.
JAMES G. VAN VLEET.